United States Patent
Binek et al.

(10) Patent No.: US 8,684,681 B2
(45) Date of Patent: Apr. 1, 2014

(54) AIR CYCLE MACHINE COMPOSITE INSULATOR PLATE

(75) Inventors: Lawrence Binek, Windsor, CT (US); Brent J. Merritt, Southwick, MA (US); Darryl A. Colson, West Suffield, CT (US)

(73) Assignee: Hamilton Sundstrand Corporation, Windsor Lock, CT (US)

( * ) Notice: Subject to any disclaimer, the term of this patent is extended or adjusted under 35 U.S.C. 154(b) by 585 days.

(21) Appl. No.: 12/974,241

(22) Filed: Dec. 21, 2010

(65) Prior Publication Data

US 2012/0156013 A1 Jun. 21, 2012

(51) Int. Cl.
*F04D 29/58* (2006.01)

(52) U.S. Cl.
USPC ......................................... 415/177

(58) Field of Classification Search
None
See application file for complete search history.

(56) References Cited

U.S. PATENT DOCUMENTS

| | | | |
|---|---|---|---|
| 4,815,184 A | 3/1989 | Johnston et al. | |
| 5,249,934 A * | 10/1993 | Merritt et al. | 417/406 |
| 7,038,162 B2 | 5/2006 | Baker et al. | |
| 7,402,020 B2 | 7/2008 | Beers et al. | |
| 2007/0134105 A1 | 6/2007 | Beers et al. | |
| 2008/0025906 A1 * | 1/2008 | Lin et al. | 423/448 |
| 2010/0064514 A1 | 3/2010 | Kersteman | |
| 2010/0084090 A1 * | 4/2010 | Shinoda et al. | 156/309.9 |
| 2012/0156065 A1 | 6/2012 | Colson et al. | |

OTHER PUBLICATIONS

U.S. Appl. No. 12/728,306, filed Mar. 22, 2010, "Journal Bearing With Dual Pass Cooling for Air Machine".
U.S. Appl. No. 12/728,313, filed Mar. 22, 2010, "Thrust Bearing Cooling Path".
U.S. Appl. No. 12/868,967, filed Aug. 26, 2010, "Compressor Bearing Cooling Inlet Plate".

* cited by examiner

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

An air cycle machine including a housing with a compressor housing portion and a turbine housing portion secured to one another by fasteners. The compressor and turbine housing portions each provide a surface. An insulator plate is provided between and engages the surfaces. The fasteners extend through circumferentially arranged holes in the insulator plate. The insulator plate has an axial width, an inner diameter and an outer diameter. The outer diameter to the inner diameter provides a first ratio of 1.19-1.21, and the inner diameter to the width provides a second ratio of 53-59. In one example, the insulator plate is a composite structure constructed from 9-12 carbon fiber laminations with each layer having directional carbon fibers oriented transversely relative to the carbon fibers of an adjacent layer.

10 Claims, 2 Drawing Sheets

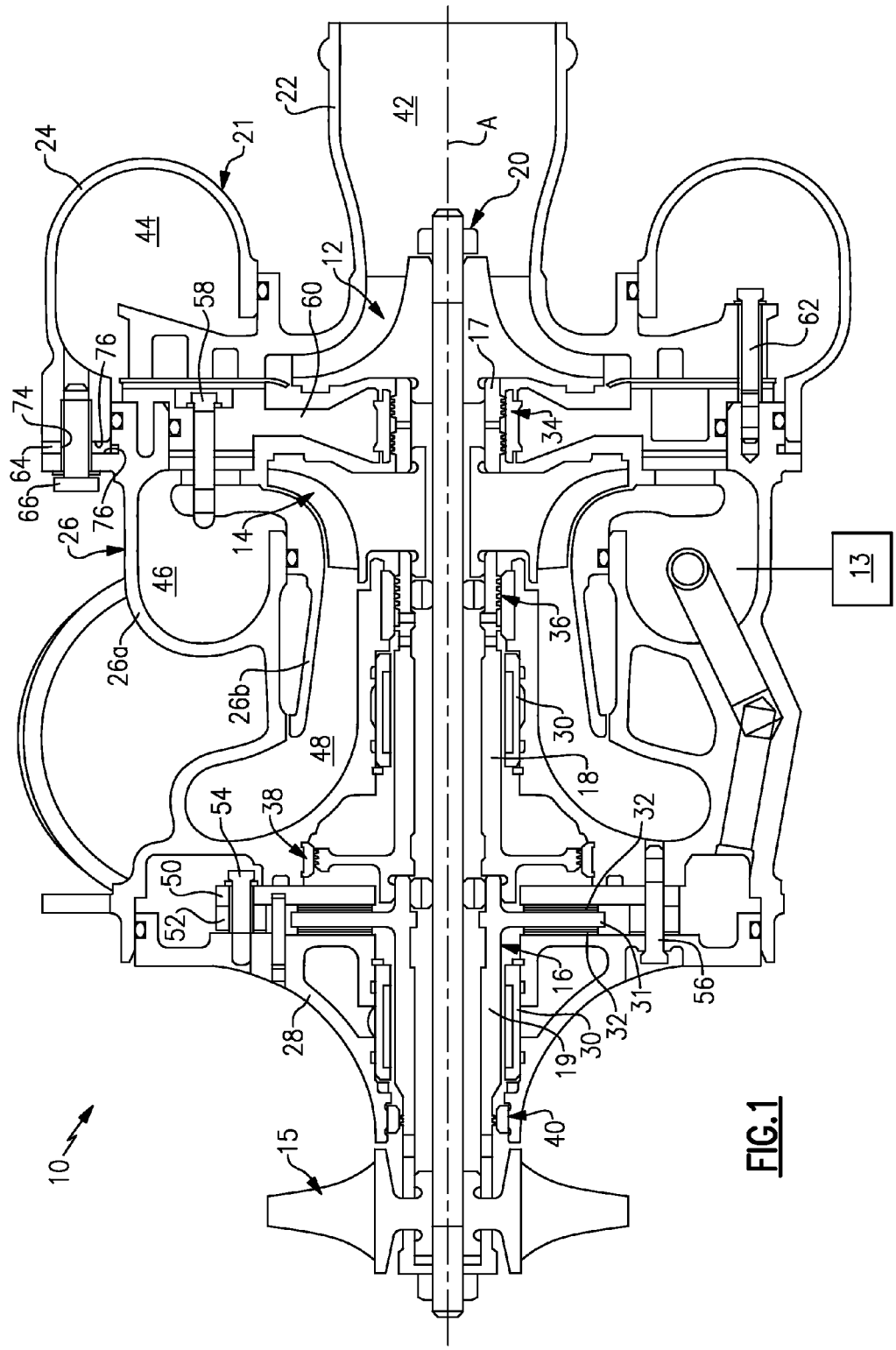

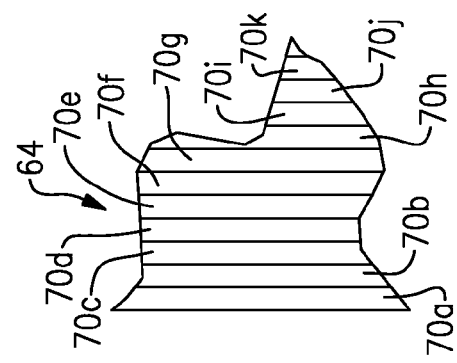
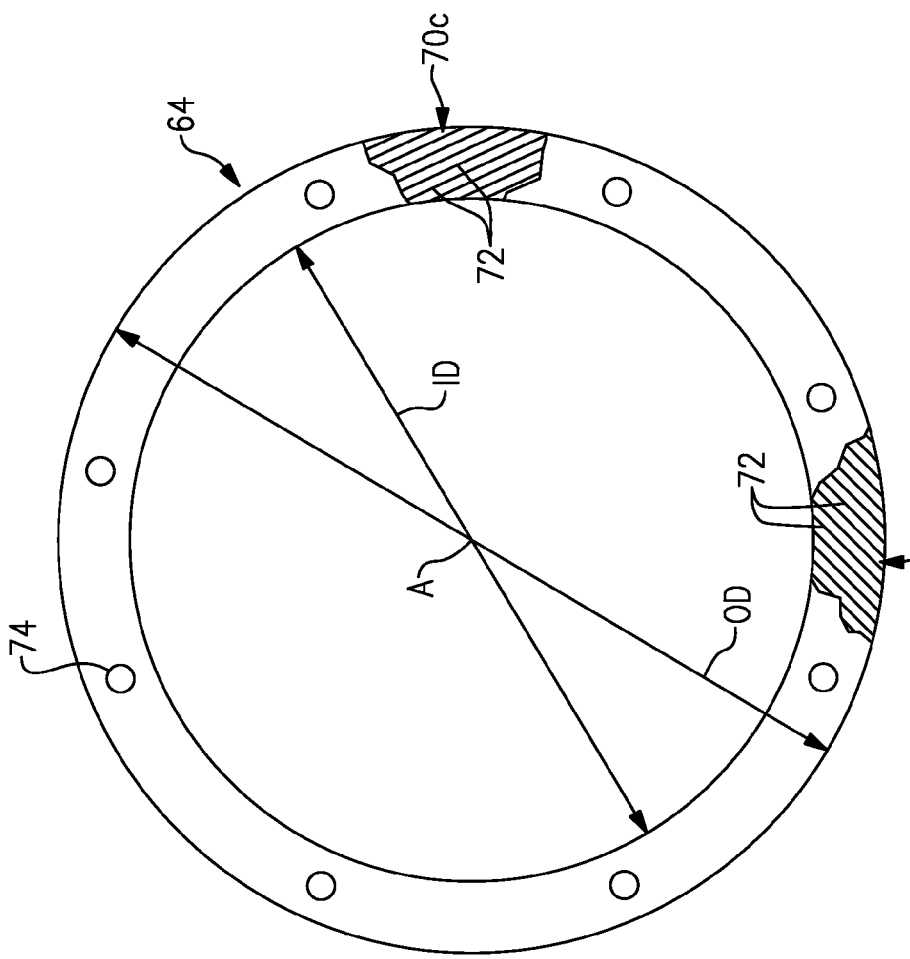

AIR CYCLE MACHINE COMPOSITE INSULATOR PLATE

BACKGROUND

This disclosure relates to an insulator plate provided between housing portions of an air cycle machine.

An air cycle machine may include a centrifugal compressor and a centrifugal turbine mounted for co-rotation on a shaft within a housing. The centrifugal compressor further compresses partially compressed air, such as bleed air received from a compressor of a gas turbine engine. The compressed air discharges to a downstream heat exchanger or other use before returning to the centrifugal turbine. The compressed air expands in the turbine to thereby drive the compressor. The air output from the turbine may be utilized as an air supply for a vehicle, such as the cabin of an aircraft.

SUMMARY

An air cycle machine including a housing with a compressor housing portion and a turbine housing portion secured to one another by fasteners. The compressor and turbine housing portions each provide a surface. An insulator plate is provided between and engages the surfaces. The fasteners extend through circumferentially arranged holes in the insulator plate. The insulator plate has an axial width, an inner diameter and an outer diameter. The outer diameter to the inner diameter provides a first ratio of 1.19-1.21, and the inner diameter to the width provides a second ratio of 53-59. In one example, the insulator plate is a composite structure constructed from 9-12 carbon fiber laminations with each layer having directional carbon fibers oriented transversely relative to the carbon fibers of an adjacent layer.

BRIEF DESCRIPTION OF THE DRAWINGS

The disclosure can be further understood by reference to the following detailed description when considered in connection with the accompanying drawings wherein:

FIG. 1 is a cross-section of an example air cycle machine.

FIG. 2 is top elevational view of an insulator plate of FIG. 1, including partially broken portions.

FIG. 3A is a side elevational view of the insulator plate illustrated in FIG. 2.

FIG. 3B is a cross-sectional view of a portion of the insulator plate of FIG. 3A.

DETAILED DESCRIPTION

FIG. 1 illustrates an air cycle machine (ACM) 10 having a compressor 12 coupled to a turbine 14 by a shaft 16, which is stainless steel for example, for rotation together about an axis A. The turbine 14 is incorporated into a cabin air supply system 13 for providing conditioned air to an aircraft, for example. A fan 15 supported by the shaft 16 circulates the conditioned air within the cabin air supply system 13.

The ACM 10 is constructed from multiple portions to facilitate assembly. For example, the ACM 10 includes a housing 21 having inlet, compressor, turbine and bearing housing portions 22, 24, 26, 28. The example shaft 16 is constructed from multiple portions also. For example, the compressor 12 is mounted on first shaft portion 17 and arranged within the inlet housing portion 22; the turbine 14 is mounted between first and second shaft portions 17, 18 within the turbine housing portion 26; and a third shaft portion 19 is mounted within the bearing housing portion 28. A tie rod 20 secures the compressor 12, turbine 14, fan 15 and first, second, third shaft portions 17, 18, 19 to one another.

Journal bearings 30 rotationally support the second and third shaft portions 18, 19 respectively within the turbine and bearing housing portions 26, 28. A thrust runner 31 extends radially from the third shaft portion 19 and is axially arranged between thrust bearings 32. A retaining plate 50 is secured to the bearing housing portion 28 about the thrust runner 31 and thrust bearings 32 by first fasteners 54. An inlet plate 52 is provided between the bearing housing portion 28 and the retaining plate 50 radially outward of the thrust runner 31 to control the flow of lubricating air to the thrust bearings 32. Second fasteners 56 secure the bearing and turbine housing portions 28, 26 to one another.

The housing portions are sealed relative to one another to contain the compressed air within the desired passageways within the ACM. However, the seals also are designed to control the amount of air leakage from the compressor 12 and the turbine 14 within the ACM 10 to lubricate the journal and thrust bearings 30, 32. In the example, a first seal 34 is arranged between the first shaft portion 17 and an intermediate housing portion 60; second and third seals 36, 38 are arranged between the second shaft portion 18 and the turbine housing portion 26; and a fourth seal 40 is arranged between the third shaft portion 19 and the bearing housing portion 28.

The inlet housing portion 22 provides a compressor inlet 42, and the compressor housing portion 24 provides a compressor outlet 44. The turbine housing portion 26, which includes first and second turbine housing portions 26a, 26b, provides a turbine inlet 46 and a turbine outlet 48. Third fasteners 58 secure the turbine and intermediate housing portions 26, 60 to one another, and fourth fasteners 62 secure the inlet and turbine housing portions 22, 26 to one another.

An insulator plate 64 is secured between the compressor and turbine housing portions 24, 26 by fifth fasteners 66 and insulates the housing portions from one another. O-rings are used to seal the other housing portions to one another. Air flows into the compressor inlet 42 and is compressed centrifugally to compressor outlet 44 where it is routed to turbine inlet 46. The compressed air expands through the turbine 14 and exits the turbine outlet 48.

The compressor and turbine housing portions 24, 26 each provide a surface 76. The insulator plate 64 is provided between and engages the surfaces 76. The fifth fasteners 66 are inserted through circumferentially arranged holes 74 in the insulator plate 64, best shown in FIGS. 2 and 3A. The insulator plate 64 has eight circumferentially spaced holes 74 axially extending an axial width W.

The insulator plate 64 has an inner diameter ID and an outer diameter OD. The outer diameter OD to the inner diameter ID provides a first ratio of 1.19-1.21, and the inner diameter ID to the width W provides a second ratio of 53-59. In one example, the outer diameter is nominally 6.750 inch (171.45 mm) and the inner diameter is nominally 5.605 (142.37 mm) inch, and the width is nominally 0.100 inch (2.54 mm).

In one example, the insulator plate 64 is a composite structure constructed from 9-12 carbon fiber laminations 70a-70k (FIG. 3B) with each layer having directional carbon fibers 72 oriented transversely relative to the carbon fibers 72 of an adjacent layer (shown in FIG. 2), for example, at 0/+45/−45/90 degree orientations. In one example, the insulator plate 64 has a thermal conductivity of 0.5 Btu/hr·ft·F.°-1.0 Btu/hr·ft·F.° (0.86532 W/m·K-1.73064 W/m·K).

Although an example embodiment has been disclosed, a worker of ordinary skill in this art would recognize that certain modifications would come within the scope of the claims.

For that reason, the following claims should be studied to determine their true scope and content.

What is claimed is:

1. An insulator plate for an air cycle machine comprising:
a composite annular body having an axial width, an inner diameter and an outer diameter, the outer diameter to the inner diameter providing a first ratio of 1.19-1.21, and the inner diameter to the width providing a second ratio of 53-59, wherein the composite annular body has a thermal conductivity of 0.5 Btu/hr·ft·F.°-1.0Btu/hr·ft·F.°.

2. The insulator plate according to claim 1, wherein the outer diameter is nominally 6.750 inch and the inner diameter is nominally 5.605 inch, and the width is nominally 0.100 inch.

3. The insulator plate according to claim 1, wherein the composite annular body is constructed from 9-12 carbon fiber laminations with each layer having directional carbon fibers oriented transversely relative to the carbon fibers of an adjacent layer.

4. The insulator plate according to claim 1, wherein the composite annular body includes eight circumferentially spaced holes axially extending the width.

5. An air cycle machine comprising:
a housing including a compressor housing portion and a turbine housing portion secured to one another by fasteners, the compressor and turbine housing portions each providing a surface; and
a composite annular body providing an insulator plate arranged between and engaging the surfaces, the fasteners extending through circumferentially arranged holes in the insulator plate, the insulator plate having an axial width, an inner diameter and an outer diameter, the outer diameter to the inner diameter providing a first ratio of 1.19-1.21, and the inner diameter to the width providing a second ratio of 53-59, wherein the composite annular body has a thermal conductivity of 0.5 Btu/hr·ft·F.°-1.0Btu/hr·ft·F.°.

6. The air cycle machine according to claim 5, comprising a compressor and a turbine disposed radially within the compressor and turbine housing portions, respectively.

7. The air cycle machine according to claim 5, wherein the outer diameter is nominally 6.750 inch and the inner diameter is nominally 5.605 inch, and the width is nominally 0.100 inch.

8. The air cycle machine according to claim 7, wherein the composite annular body is constructed from 9-12 carbon fiber laminations with each layer having directional carbon fibers oriented transversely relative to the carbon fibers of an adjacent layer.

9. The air cycle machine according to claim 5, wherein the composite annular body includes eight circumferentially spaced holes axially extending the width.

10. A method of assembling an air cycle machine comprising the steps of:
providing an insulator plate with circumferentially arranged holes, the insulator plate having an axial width, an inner diameter and an outer diameter, the outer diameter to the inner diameter providing a first ratio of 1.19-1.21, and the inner diameter to the width providing a second ratio of 53-59, wherein the insulator plate is a composite structure constructed from 9-12 carbon fiber laminations with each layer having directional carbon fibers oriented transversely relative to the carbon fibers of an adjacent, and wherein the composite annular body has a thermal conductivity of 0.5 Btu/hr·ft·F.°-1.0 Btu/hr·ft·F.° layer;
arranging the insulator plate between surfaces of a turbine housing portion and a compressor housing portion; and
inserting fasteners through the turbine and compressor housing portions and the holes, and tightening the fasteners to clamp the insulator plate between the turbine and compressor housing portions.

* * * * *

UNITED STATES PATENT AND TRADEMARK OFFICE
CERTIFICATE OF CORRECTION

PATENT NO. : 8,684,681 B2  
APPLICATION NO. : 12/974241  
DATED : April 1, 2014  
INVENTOR(S) : Lawrence Binek et al.

Page 1 of 1

It is certified that error appears in the above-identified patent and that said Letters Patent is hereby corrected as shown below:

IN THE CLAIMS:

In claim 10, column 4, line 28; after "adjacent" insert --layer,--

In claim 10, column 4, line 30; delete "layer"

Signed and Sealed this
Nineteenth Day of August, 2014

Michelle K. Lee
*Deputy Director of the United States Patent and Trademark Office*